(12) United States Patent
Takahashi et al.

(10) Patent No.: US 10,046,253 B2
(45) Date of Patent: Aug. 14, 2018

(54) FILTRATION DEVICE

(71) Applicants: FUJI FILTER MANUFACTURING CO., LTD., Tokyo (JP); JFE Engineering Corporation, Tokyo (JP)

(72) Inventors: Yuichi Takahashi, Utsunomiya (JP); Hiroyuki Takahashi, Sakura (JP); Masanori Nagafuji, Tokyo (JP); Yusuke Shimono, Tokyo (JP)

(73) Assignees: FUJI FILTER MANUFACTURING CO., LTD., Tokyo (JP); JFE Engineering Corporation, Tokyo (JP)

( * ) Notice: Subject to any disclaimer, the term of this patent is extended or adjusted under 35 U.S.C. 154(b) by 203 days.

(21) Appl. No.: 15/028,406

(22) PCT Filed: Mar. 25, 2015

(86) PCT No.: PCT/JP2015/059172
§ 371 (c)(1),
(2) Date: Apr. 8, 2016

(87) PCT Pub. No.: WO2016/051824
PCT Pub. Date: Apr. 7, 2016

(65) Prior Publication Data
US 2016/0250572 A1    Sep. 1, 2016

(30) Foreign Application Priority Data

Oct. 3, 2014   (JP) .................................. 2014-204991

(51) Int. Cl.
*B01D 29/66* (2006.01)
*B01D 29/11* (2006.01)
(Continued)

(52) U.S. Cl.
CPC ............ *B01D 29/66* (2013.01); *B01D 29/117* (2013.01); *B01D 29/23* (2013.01); *B01D 29/52* (2013.01);
(Continued)

(58) Field of Classification Search
CPC .. B01D 29/66; B01D 29/684; B01D 29/6423; B01D 29/52; B01D 29/23; B01D 29/6407; B01D 29/117
See application file for complete search history.

(56) References Cited

U.S. PATENT DOCUMENTS 2,858,894 A * 11/1958 Akeyson ............... E21B 43/084
166/230
2014/0366493 A1   12/2014 Takahashi

FOREIGN PATENT DOCUMENTS

JP          S44-3739 Y1     2/1969
JP          51-002384 U     1/1976
(Continued)

OTHER PUBLICATIONS

International Preliminary Report on Patentability from International Application No. PCT/JP2015/059172, dated Apr. 13, 2017.
Japanese Office Action from Japanee Patent Application No. 2014-204991, dated Jan. 16, 2018, 6 pages.

*Primary Examiner* — Chester T Barry
(74) *Attorney, Agent, or Firm* — McDermott Will & Emery LLP

(57) ABSTRACT

A filtration device including: a casing 1 having a fluid inlet 6, a fluid outlet 7, a raw fluid chamber 8, and a filtered-fluid chamber 9; a box-shaped or tube-shaped filter element 3 (3a, 3b) having a filter medium 31 removably installed inside the casing 1, allowing the fluid to pass through from inside to outside to filter the fluid, and having a backwashing mechanism inside thereof; and a backwash fluid discharge pipe 4 which discharges backwash fluid to the outside, wherein the (Continued)

backwashing mechanism has a fixed pipe 33 fixed to the inside of the filter element, a movable pipe 34 movably fitted to the outside of the fixed pipe, and a backwash head 35 attached to the movable pipe to backwash the filter medium, wherein the fixed pipe and the movable pipe movably guide the backwash head and form a discharge passage for backwash fluid.

12 Claims, 16 Drawing Sheets

(51) Int. Cl.
    *B01D 29/64* (2006.01)
    *B01D 29/23* (2006.01)
    *B01D 29/52* (2006.01)
    *B01D 29/68* (2006.01)

(52) U.S. Cl.
    CPC ..... *B01D 29/6407* (2013.01); *B01D 29/6423* (2013.01); *B01D 29/684* (2013.01)

(56) References Cited

FOREIGN PATENT DOCUMENTS

| | | |
|---|---|---|
| JP | S60-024314 U | 2/1985 |
| JP | 02-068380 | 3/1990 |
| JP | 10-118430 | 5/1998 |
| JP | 2014-080754 A | 5/2014 |
| JP | 2014-094346 A | 5/2014 |
| JP | 2015-080754 A | 4/2015 |
| WO | 2011/108541 A1 | 9/2011 |

* cited by examiner

FILTRATION DEVICE

TECHNICAL FIELD

The present invention relates to a filtration device capable of filtering fluid by allowing the fluid pass through a filter element, removing substances trapped in the filter element during the filtration by using a backwash head, and achieving reduction in size of the device and improving the workability of assembly adjustment and maintenance.

BACKGROUND ART

Conventionally, in the filtration of water such as seawater, lake water, river water, water in a water supply, and water in a wastewater system, the filtration of liquid for general industrial use such as cooling water for various devices or process liquid, and the filtration of gas and the like of various untreated materials for use in a chemical plant or the like, various filtration devices have been used for the purpose of trapping and removing fine particles, dust, and the like contained therein.

When a filtration device as mentioned above is operated for filtration for a long period, solid matter, gel, dust, and the like are trapped and accumulated in the filter, so that resistance of the fluid to pass through a filter medium increases, and this makes it difficult to filter target fluid in the end. In order to cope with this problem, for example, a process called "backwashing" is carried out periodically, where fluid is made to pass through the filter in a direction opposite to the flow direction for filtration, to remove trapped substances adhering to the filter in order to recover the filtration performance of the filter. This method, called "backwashing", is an excellent method capable of reducing filter-passing resistance to approximate it to the initial passing resistance easily without demounting the filter. In particular, in the case of a filtration device provided with a dedicated backwashing channel, it is advantageous in that backwashing can be carried out without interrupting the filtration.

As such a filtration device capable of carrying out "backwashing," there is a filtration apparatus provided with an untreated water inlet for letting untreated water flow into a filtration tank, and a filtered water outlet for letting filtered water obtained by filtering untreated water using filters flow out. The internal space of the filtration tank is divided by the filters into multiple compartments so that the multiple compartments are arranged alternately as inflow chambers communicating with the untreated water inlet and outflow chambers communicating with the filtered water outlet. A backwash collection pipe having a water collection port is disposed so as to come into surface contact with such a filter from the inside of the inflow chamber, and is provided to be movable on the surface of the filter. A backwash water discharge pipe is connected to the backwash collection pipe and extends to the outside of the filtration tank. The backwash collection pipe receives backwash water passing through the filter from the outflow chamber side and flowing into the water collection port. The backwash water separates, from the filter surface, deposits trapped on the filter surface of the inflow chamber side. The backwash collection pipe receives the separated deposits from the water collection port together with the backwash water, and discharges the deposits and backwash water as backwash discharge water through the backwash water discharge pipe to the outside of the filtration tank (for example, see Patent Document 1).

In this filtration apparatus, since backwash is carried out using the backwash collection pipe that comes into surface contact with the filter, or using the backwash collection pipe together with a brush, a superior washing effect can be obtained. Further, since the water collection pipe backwashes only a portion of the area of the filter surface at a time while moving the portion to be backwashed, filtration can be continued even during backwashing in areas of the filter surface that are not subjected to backwashing, and this has the advantage that the usage efficiency of the filtration device is high.

Further, in this filtration apparatus, the compartments are arranged alternately as the inflow chambers communicating with the untreated water inlet and the outflow chambers communicating with the filtered water outlet to increase filtration area, water collection pipes are arranged back to back to backwash the filters arranged opposite to the inside of each inflow chamber, and a distribution pipe common thereto is provided in an integrated fashion. Accordingly, this filtration apparatus has an advantage that it is possible to obtain a simplified structure.

REFERENCE DOCUMENT LIST

Patent Document

Patent Document 1: PCT International Publication No. WO 2011/108541

SUMMARY OF THE INVENTION

Problems to be Solved by the Invention

However, in the filtration apparatus, since the guide mechanism for moving the backwash collection pipe is constituted by the backwash water discharge pipe connected to the water collection pipe and a sheath fitted to the outside of the backwash water discharge pipe and arranged outside of the filtration tank, there is a problem that this guide mechanism and a drive mechanism protrude to the outside of the filtration tank, which prevents reduction of the apparatus size.

Further, since the backwash collection pipe and the backwash water discharge pipe integrated therewith are installed in each inflow chamber after the inflow chamber and the outflow chamber are alternately arranged, there is a need to adjust the position of the filter and the water collection pipe at the time of assembly, especially to adjust the contact pressure, and further, there is a room for improvement of workability when the apparatus is disassembled for maintenance.

Therefore, it is an object of the present invention to deal with such problems and to provide a filtration device capable of reducing the size of the filtration device and improving the workability of assembly adjustment and maintenance.

Means for Solving the Problems

In order to attain the object, a filtration device according to the present invention includes: a casing having a fluid inlet and a fluid outlet, and including, inside thereof, a raw fluid chamber communicating with the fluid inlet for storing fluid before being filtered, and a filtered-fluid chamber communicating with the fluid outlet for storing filtered fluid; a filter element having a filter medium and formed into a box or tube shape, removably installed inside the casing, and one face or two opposite faces of which are open to receive fluid from the raw fluid chamber through the open one face or two opposite faces and allow the fluid to pass through from inside toward the filtered-fluid chamber outside thereof so as to filter the fluid, and having a backwashing mechanism inside thereof; and a backwash fluid discharge pipe which discharges backwash fluid from the backwashing mechanism to the outside of the casing, wherein the backwashing mechanism includes: a fixed pipe fixed to the inside of the filter element and connected to the backwash fluid discharge pipe; a movable pipe fitted to the outside of the fixed pipe and provided to be movable in an axial direction thereof; and at least one backwash head attached to the movable pipe and having an inflow inlet arranged to come into surface contact with the filter medium to allow fluid outside of the filter element to pass through the filter medium as backwash fluid and flow into the inflow inlet in order to backwash the filter medium, and wherein the fixed pipe and the movable pipe movably guide the backwash head and form a discharge passage for backwash fluid.

Effects of the Invention

According to the filtration device of the present invention, the filtration device is a filtration device having a box-shaped or tube-shaped filter element including the backwashing mechanism inside thereof, and the backwashing mechanism is configured to include, inside the filter element, the fixed pipe, the movable pipe, and the backwash head. Accordingly, the backwashing mechanism can be housed inside the filter element and hence the device can be reduced in size. Further, since the fixed pipe and the movable pipe serve both as a guide mechanism for moving the backwash head and as a discharge passage for backwash fluid, the device structure is so simple that the cost reduction and the improvement of reliability can be achieved. Further, since the contact pressure or a gap between the filter medium and the backwash heads is determined by the distance between the filter medium and the fixed pipe fixed to the inside of the filter element, assembly adjustment is made easy. In addition, since the filter element is removably provided inside the casing of the filtration device, the filter element can be easily removed from the casing, and hence workability at the time of maintenance can be improved.

BRIEF DESCRIPTION OF THE DRAWINGS

FIG. 7A illustrates an example of a plain woven mesh, and FIG. 7B illustrates an example of punched metal.

FIG. 8A illustrates an example of a plain dutch woven mesh, and FIG. 8B is a sectional view taken along line W-W in FIG. 8A.

MODES FOR CARRYING OUT THE INVENTION

Embodiments of the present invention will be described below with reference to the accompanying drawings.

First Embodiment

Figure 1:
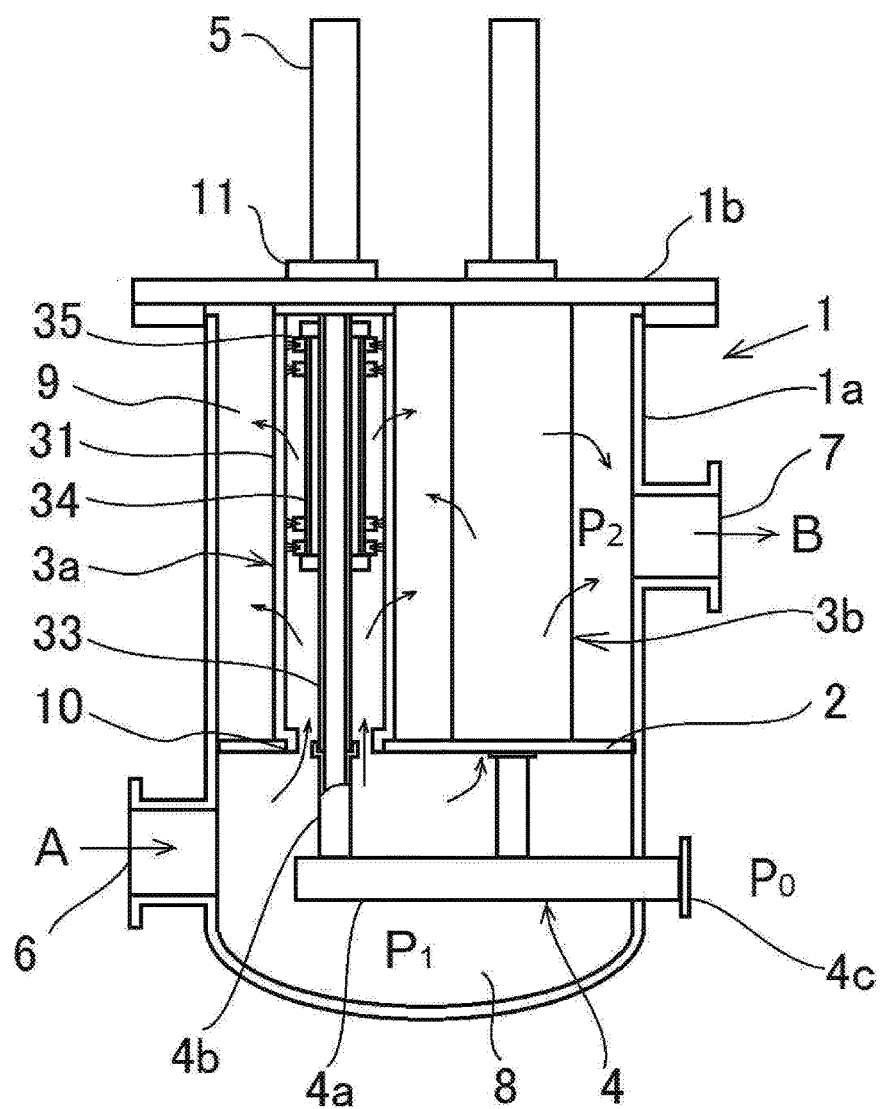
FIG. 1 is a schematic sectional view illustrating a state of a first embodiment of a filtration device according to the present invention during filtration.

FIG. 1 is a schematic sectional view illustrating a state of a first embodiment of a filtration device according to the present invention during filtration. The filtration device of the embodiment uses a box-shaped filter element with only one side open. This filtration device is to filter, for example, the ballast water of a vessel, and is configured to include a casing 1, a partition wall 2, a box-shaped filter element 3 (3a, 3b), a backwash fluid discharge pipe 4, and air cylinders as a driving source 5.

The casing 1 serves as an outer shell of the filtration device, and is made up of a casing main body 1a and a casing lid 1b. The casing main body 1a is formed in a tubular shape (for example, a cylindrical shape) having a closed bottom, a rectangular parallelepiped shape, or the like, which has a fluid inlet 6, for example, in a lower end portion of the side wall to allow fluid to enter from the outside, and a fluid outlet 7 in an upper portion of the side wall to allow fluid filtered inside thereof to flow out to the outside. The casing lid 1b is a lid placed on the casing main body 1a to seal the inside of the casing 1. The material of the casing 1 is metal, synthetic resin, or the like, which can be determined appropriately according to the shape, size, and intended use of the filtration device, and the shape and size thereof can be determined appropriately according to the intended use of the filtration device, the kind and amount of fluid to pass through, the installation location, and the like.

In a lower portion inside the casing 1, the partition wall 2 is provided horizontally. This partition wall 2 is a wall that partitions the inside of the casing 1 into a raw fluid chamber 8 communicating with the fluid inlet 6 for storing fluid before being filtered, and a filtered-fluid chamber 9 communicating with the fluid outlet 7 for storing the filtered fluid. In multiple portions of the partition wall 2, through holes 10 are formed to each fit and hold the lower end of the box-shaped filter element 3.

On the upper side of the partition wall 2, each of multiple box-shaped filter elements 3 (two filter elements 3a, 3b are illustrated in FIG. 1) is provided inside the filtered-fluid chamber 9 in parallel with the vertical direction in such a manner that the lower end as an open end thereof is fitted and held in each of the through holes 10, and the inside thereof communicates with the raw fluid chamber 8. This box-shaped filter element 3 has planar filter media 31 to let target fluid pass through from the inside to the outside to trap and filter out solid matter, gel, dust, and the like contained in the fluid, and the planar filter media 31 are backwashed by a backwashing mechanism (33, 34, 35) provided inside the filter element 3. The box-shaped filter element 3 is provided vertically so that the open end faces down. Accordingly, among the trapped substances, heavy trapped substances such as pebbles that are difficult to remove by the backwashing mechanism easily fall to the bottom of the casing 1, and this can reduce failure of the backwashing mechanism. One or more box-shaped filter elements 3 are arranged inside the casing 1.

Figure 2:
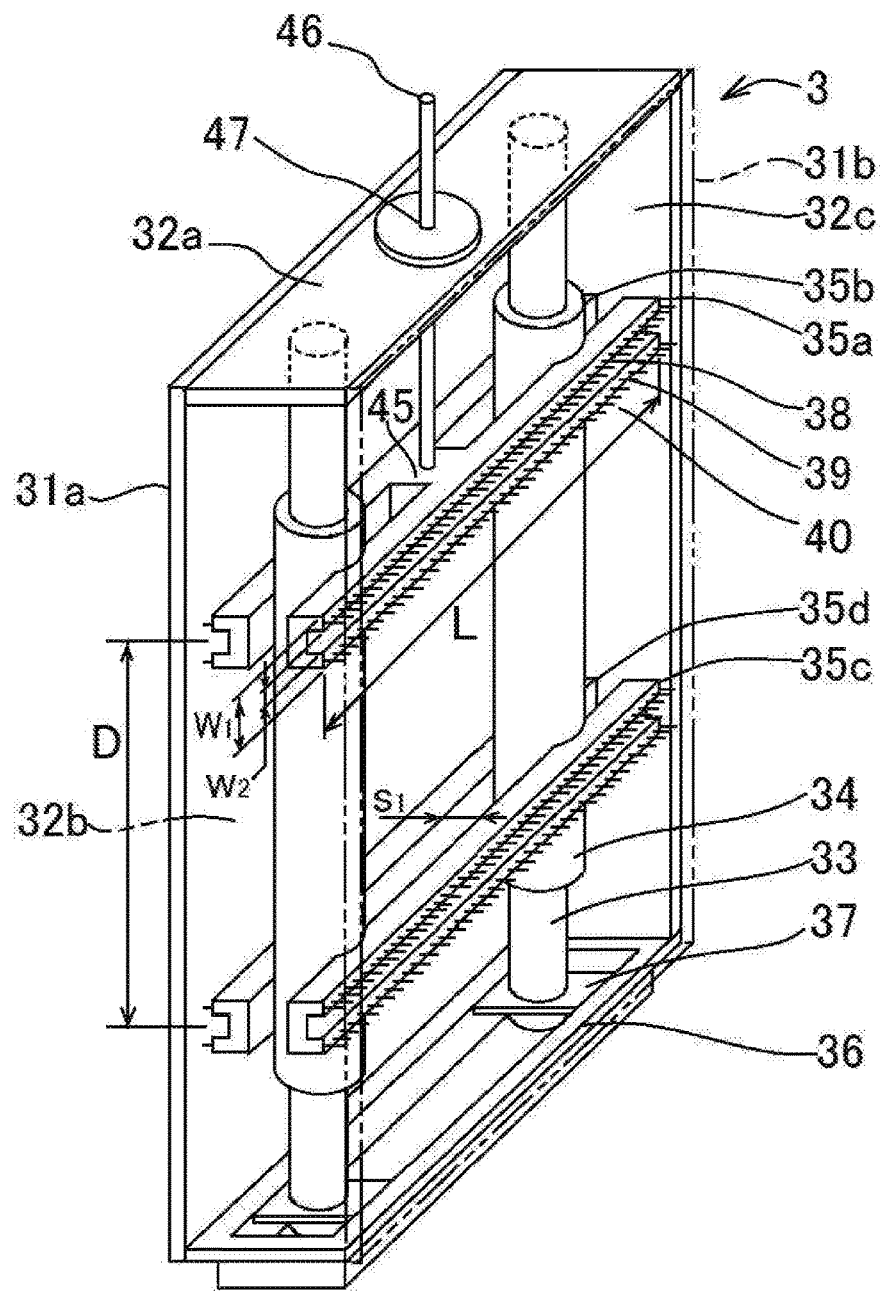
FIG. 2 is a schematic perspective view illustrating a box-shaped filter element of the filtration device of FIG. 1.

As illustrated in FIG. 2, the box-shaped filter element 3 forms a box body having an approximately rectangular parallelepiped shape with the lower side open and is made up of a pair of planar filter media 31a, 31b arranged to face each other, and three closure plates 32 (an upper end plate 32a, a front side plate 32b, and a rear side plate 32c) substantially orthogonal to the planar filter media 31a, 31b, and the filter element 3 further has a backwashing mechanism made up of two fixed pipe 33 and movable pipe 34 assemblies arranged in parallel with each other, and two pairs of backwash heads 35a, 35b, and 35c, 35d mounted orthogonally to these assemblies that are provided inside the box body.

The planar filter medium 31 may be any filter medium so long as it is formed of multiple laminated layers so that the innermost layer will be the finest mesh. For example, it may be a filter medium made by sintering multiple laminated wire meshes to enhance shape retention and forming them into a planar shape and sintering the planar shape, a filter medium made up of planar notch wires, a filter medium made up of wedge wires, or the like. In the case of the sintered one, the mesh sizes of the layers may be selected appropriately from mesh sizes of 10 to 200 μm for the innermost layer and from mesh sizes of 200 to 5000 μm for the outer layers. In this case, since a reinforcing mesh or a protective mesh other than the innermost layer is related to the strength of the box-shaped filter element 3, the number of layers, the mesh size, and the wire diameter are so selected that a required strength can be obtained. Further, as the way of weaving each mesh, plain weave, twilled weave, satin weave, dutch weave, twilled dutch weave, or the like can be applied. The structure may also be such that a wire mesh is provided as the innermost layer and a planar punching plate having numerous rectangle holes bored therein or a plurality of thin rods extending along the vertical and horizontal directions is arranged as a reinforcing member outside of the innermost layer, and they are sintered together.

The upper end plate 32a, the front side plate 32b, and the rear side plate 32c form a box-shaped structure together with the pair of planar filter media 31a, 31b to hold the planar filter media 31a, 31b as parts of the structure of the box-shaped filter element 3. Among them, the upper end plate 32a fixes the upper end of the fixed pipe 33 to thereby hold the fixed pipe 33.

Although the lower end of the box-shaped structure is open, a frame-like end member 36 is provided around the opening part so that the end member 36 can be fitted in each of the through holes 10 of the partition wall 2, and a supporting member 37 is provided across the opening part of the end member 36 to support the lower end of the fixed pipe 33.

The fixed pipe 33 and the movable pipe 34 fitted around the outside of the fixed pipe 33 movably guide the backwash heads 35 and form a discharge passage for backwash fluid. As illustrated in FIG. 2, the fixed pipe 33 is provided to be parallel with the surface of the planar filter medium 31, the upper end of the fixed pipe 33 is fixed to the upper end plate 32a, the lower end portion thereof is supported by the supporting member 37, and the lower end thereof is adapted to be connected to the backwash fluid discharge pipe 4. The movable pipe 34 is fitted around the outside of the fixed pipe 33 to be movable in the axial direction thereof, and the backwash heads 35 are attached to the outer circumferential side thereof. According to this structure, since the contact pressure or a gap between the backwash heads 35 and the planar filter medium 31 is determined by the distance between the planar filter medium 31 and the fixed pipe 33 fixed to the box-shaped filter element 3, assembly adjustment is made unnecessary or easy.

Figure 3:
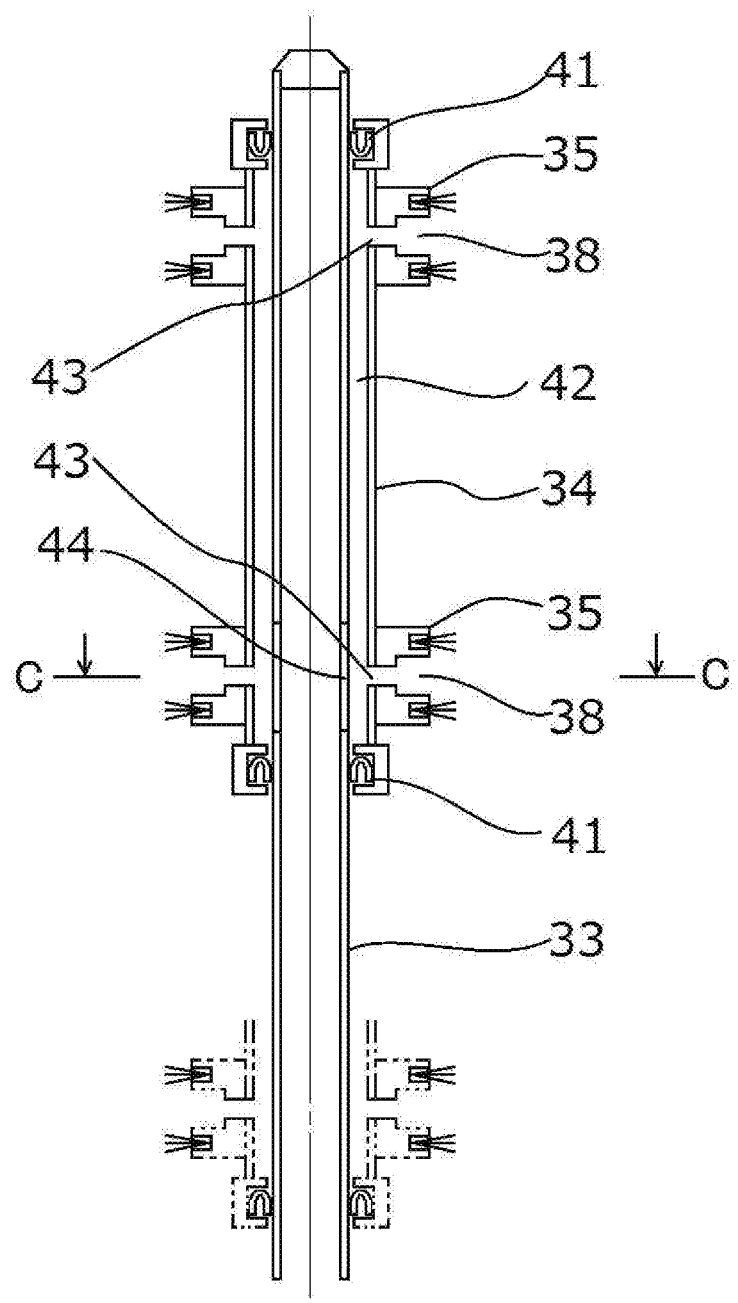
FIG. 3 is a schematic longitudinal sectional view illustrating backwash heads, a movable pipe, and a fixed pipe of the box-shaped filter element of FIG. 2.

As illustrated in FIG. 3, in the structure of the fixed pipe 33 and movable pipe 34 assembly, the inner circumferential surface of the movable pipe 34 is fitted around the outer circumferential surface of the fixed pipe 33 at both ends of the movable pipe 34 in the axial direction thereof, and seals 41 are provided at these end portions. The movable pipe 34 is guided by the fixed pipe 33 in these fitted portions at both ends to be movable in the axial direction.

Figure 4:
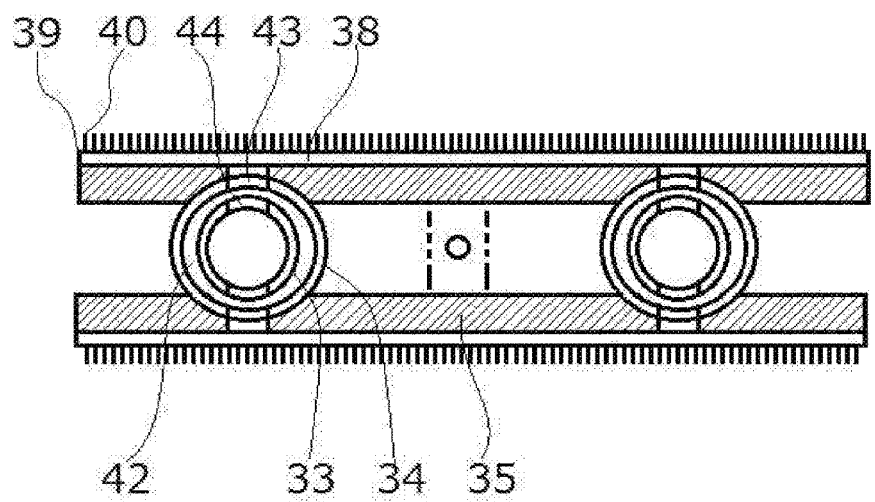
FIG. 4 is a sectional view taken along line C-C in FIG. 3.

On the other hand, a cylindrical gap 42 both ends of which are sealed by the seals 41 is formed between the inner circumferential surface of the movable pipe 34 and the outer circumferential surface of the fixed pipe 33 in a central part in the axial direction of the movable pipe 34. Further, as illustrated in FIG. 3 and FIG. 4, there are provided movable pipe through holes 43 passing through from the gap 42 to the outer circumferential surface side of the movable pipe 34 to make the gap 42 communicate with the backwash heads 35, and a fixed pipe through hole 44 passing through from the gap 42 to the inside of the fixed pipe 33. Thus, the movable pipe through holes 43, the gap 42, the fixed pipe through hole 44, and the inside of the fixed pipe 33 form a discharge passage for backwash fluid. Here, the gap 42 has an axial direction length enough to maintain communication between the movable pipe through holes 43 and the fixed pipe through hole 44 even when the movable pipe 34 moves within a predetermined range, and this can ensure a secure passage. The upper end side of the fixed pipe is closed to prevent raw fluid from entering thereinto, and the lower end side thereof is open to be connectable to the backwash fluid discharge pipe 4 in a manner to be described later.

In this embodiment, two fixed pipe 33 and movable pipe 34 assemblies are arranged in parallel with each other, and the backwash heads 35 are so attached that the longitudinal direction thereof will be orthogonal to the axial direction of these assemblies. This also suppresses rolling (rotational error around the moving axis) when the backwash heads 35 move, so that the contact pressure or the gap between the backwash heads 35 and the planar filter media 31 can be maintained adequately over the entire areas in the longitudinal direction of the backwash heads 35 to achieve uniform backwashing. However, only one fixed pipe 33 and movable pipe 34 assembly may be provided at the center in the longitudinal direction of the backwash heads 35 so that the rolling of the backwash heads 35 will be controlled by contact with the planar filter medium 31, or one fixed pipe 33 and movable pipe 34 assembly may be used in combination with any other known guide mechanism to restrict the rolling of the backwash heads 35.

Further, in the embodiment, both of the two fixed pipe 33 and movable pipe 34 assemblies are used as discharge passages of backwash fluid to carry out backwashing with a uniform and sufficient flow rate. However, among the two fixed pipe 33 and movable pipe 34 assemblies, one assembly may be used to discharge backwash fluid from all the backwash heads 35 so that the other fixed pipe 33 and movable pipe 34 assembly will be used only to guide the backwash heads 35 without being used as the discharge passage for backwash fluid. In this case, it is only necessary to close the lower end of the fixed pipe 33 without connecting it to the backwash fluid discharge pipe 4. Thus, since it is sufficient to connect the backwash fluid discharge pipe 4 to only one fixed pipe 33, the device structure is simplified and hence workability at the time of maintenance is further improved.

The backwash heads 35 are so arranged that inflow inlets 38 will come into surface contact with the planar filter media 31 on the inside of the box-shaped filter element 3 to cause fluid in the filtered-fluid chamber 9 to flow through the planar filter medium 31 into the inflow inlets 38 to thereby backwash the planar filter media 31. In the embodiment, as illustrated in FIG. 2, two upper and lower pairs of backwash heads 35a, 35b and 35c, 35d are attached to the movable pipes 34 to come into surface contact with the planar filter media 31a, 31b on the inside of the box-shaped filter element 3, and each pair is arranged back to back to form the shape of a hanging rack as a whole. This can backwash the pair of planar filter media 31a, 31b at the same time. In addition, since the two upper and lower pairs of backwash heads 35a, 35b and 35c, 35d are arranged at an interval D in the axial direction of the movable pipes 34, two portions of each planar filter medium 31 in the axial direction thereof can be backwashed at the same time, and hence the entire area of the planar filter medium 31 in the axial direction thereof can be backwashed with a small movable stroke.

In this specification, it is assumed that the "inflow inlets 38" each means a recessed portion formed in the backwash head surface around a communication hole penetrating the backwash head 35 to reach the movable pipe 34, the inflow inlet 38 forms a space lower in pressure than the filtered-fluid chamber 9 between the backwash head surface and the filter medium surface during backwashing. The same applies to "inflow inlets 138" in the second embodiment, to be described later.

Further, in the embodiment, the inflow inlets 38 of the backwash heads 35 each has an elongated shape, the longitudinal direction thereof is arranged to be orthogonal to the axis of the fixed pipes 33, and the size L in the longitudinal direction is set to such a size that can backwash the entire area of the planar filter medium 31 in a direction orthogonal to the axis of the fixed pipes 33 at the same time. Thus, using the fixed pipes 33 and the movable pipes 34, the backwash heads 35 are moved only in the axial direction of the fixed pipes 33 and the movable pipes 34 to be able to backwash the entire surface of the planar filter medium 31. Note that, since a width w1 of the backwash heads 35 is small, filtration can be continued even during backwashing in portions where the backwash heads 35 are not in surface contact with the filter surfaces, and hence a high usage efficiency of the filtration device can be secured. Further, there is a space s1 between each pair of backwash heads 35 arranged back to back to allow raw fluid to pass therethrough.

The dimension of the inflow inlets 38 of the backwash heads 35 is 3 mm or more in width w2 and 20 mm or more in length L. This is because, if the dimension of the inflow inlets 38 having an elongated shape as mentioned above is less than the above dimension, fibrous foreign substances, especially contained in ballast water, may be caught in the inflow inlets 38 and not be discharged to the backwash fluid discharge pipe. The width w2 is preferably 4 mm or more, more preferably 6 mm or more, and the length L is preferably 50 mm or more, more preferably 60 mm or more. For the same reason, the passage diameter of a backwash fluid discharge path subsequent to the inflow inlets 38 is 4 mm or more, more preferably 6 mm or more.

Further, in the embodiment, a removal brush 40 is arranged in each of bank-like parts 39 provided on both sides of each backwash head 35 in the width direction of the inflow inlet 38 to scrape trapped substances on the planar filter medium 31 by the movement of the backwash head 35. This can enhance the backwashing effect. The material of the bristles of this removal brush 40 is, for example, natural or synthetic fiber, or metal wires made of steel, copper, brass, or the like, which is selected according to the intended use of the filtration device and the fluid to be passed through.

Note that a scraper or the like, formed into a blade shape or a spatula shape and made of metal, resin, or rubber, may be provided in each of the bank-like parts 39 instead of the removal brush 40 to slidingly contact the surface of the planar filter medium 31 so as to remove trapped substances.

In this specification, the "inflow inlets come into surface contact" or the "backwash heads come into surface contact" means that one of the bank-like parts 39 and the removal brush 40 or the scraper, which is closest to the planar filter medium 31, contacts the planar surface of the planar filter medium 31.

A coupling member 45 is provided to bridge central portions of the pair of upper backwash heads 35a, 35b to thereby couple these backwash heads, and a drive rod 46 is provided from the coupling member 45 to project from the upper face of the box-shaped filter element 3 through a through hole 47 bored in the upper end plate 32a. Note that a seal (not shown) is provided between the through hole 47 and the drive rod 46 so as not to allow fluid to leak out.

Returning to FIG. 1, the casing lid 1b is placed above the box-shaped filter elements 3 (3a, 3b) to cover the casing main body 1a, and this holds down the box-shaped filter elements 3 so that fitting in the through hole 10 of the partition wall 2 will not come off. A through hole (not shown) is also bored in the casing lid 1b to allow the drive rod 46 (see FIG. 2) extend upward therethrough. A seal (not shown) is also provided between this through hole and the drive rod 46. Air cylinders are mounted on the upper side of the casing lid 1b as the driving source 5 in the vertical direction via adapters 11, and removably coupled to the drive rod 46. By actuating the air cylinders 5, this drive rod 46 is driven to move up and down the pair of upper backwash heads 35a, 35b (see FIG. 2) and the pair of lower backwash heads 35c, 35d (see FIG. 2) connected further through two movable pipes 34 in the box-shaped filter element 3.

Note that any known driving source, such as hydraulic cylinders, or an electric motor and a feed screw mechanism driven thereby, can be used as the driving source 5 instead of the air cylinders.

As illustrated in FIG. 1, the backwash fluid discharge pipe 4 is connected to the discharge side of the fixed pipes 33 of the box-shaped filter element 3 (3a, 3b). This backwash fluid discharge pipe 4 is to discharge, to the outside of the casing 1, backwash fluid and removed trapped substances during backwashing of the box-shaped filter element 3, which is made up of a linear pipe 4a extending in the radial direction of the casing 1 and branch pipes 4b branched from the linear pipe 4a to extend upward to be connected to the fixed pipes of the box-shaped filter elements 3. A discharge outlet 4c at the tip end of the linear pipe 4a projects to the outside of the casing 1.

When each of the box-shaped filter elements 3 (3a, 3b) is fitted in the through hole 10 of the partition wall 2, the fixed pipe 33 is fitted in the branch pipe 4b of the backwash fluid discharge pipe 4 to be connected in an airtight manner by the seal. This makes it easy to demount the box-shaped filter element 3, and hence allows superior maintenance to be ensured.

An on-off valve, not shown, is connected to the discharge side of the discharge outlet 4c of the backwash fluid discharge pipe 4. This on-off valve opens or closes a backwash fluid discharging system including the backwash heads 35, the backwash fluid discharge passage, and the backwash fluid discharge pipe 4, so as to open the system during backwashing of the filtration device and to close the system during periods other than during backwashing. The discharge side of this on-off valve is released to a lower in pressure than the pressure of the fluid outlet 7, for example, to the atmospheric pressure $P_0$.

Figure 5:
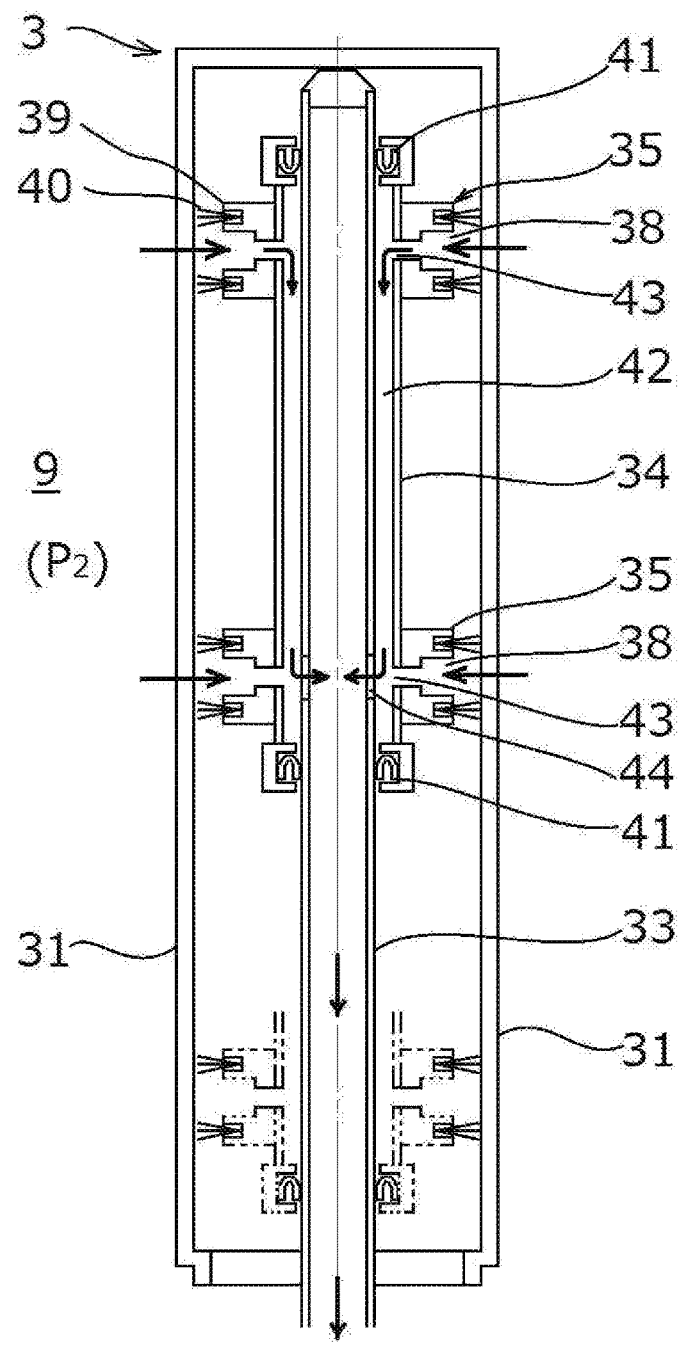
FIG. 5 is a longitudinal sectional view illustrating a flow of backwash fluid in the filter element of FIG. 2.
Figure 6:
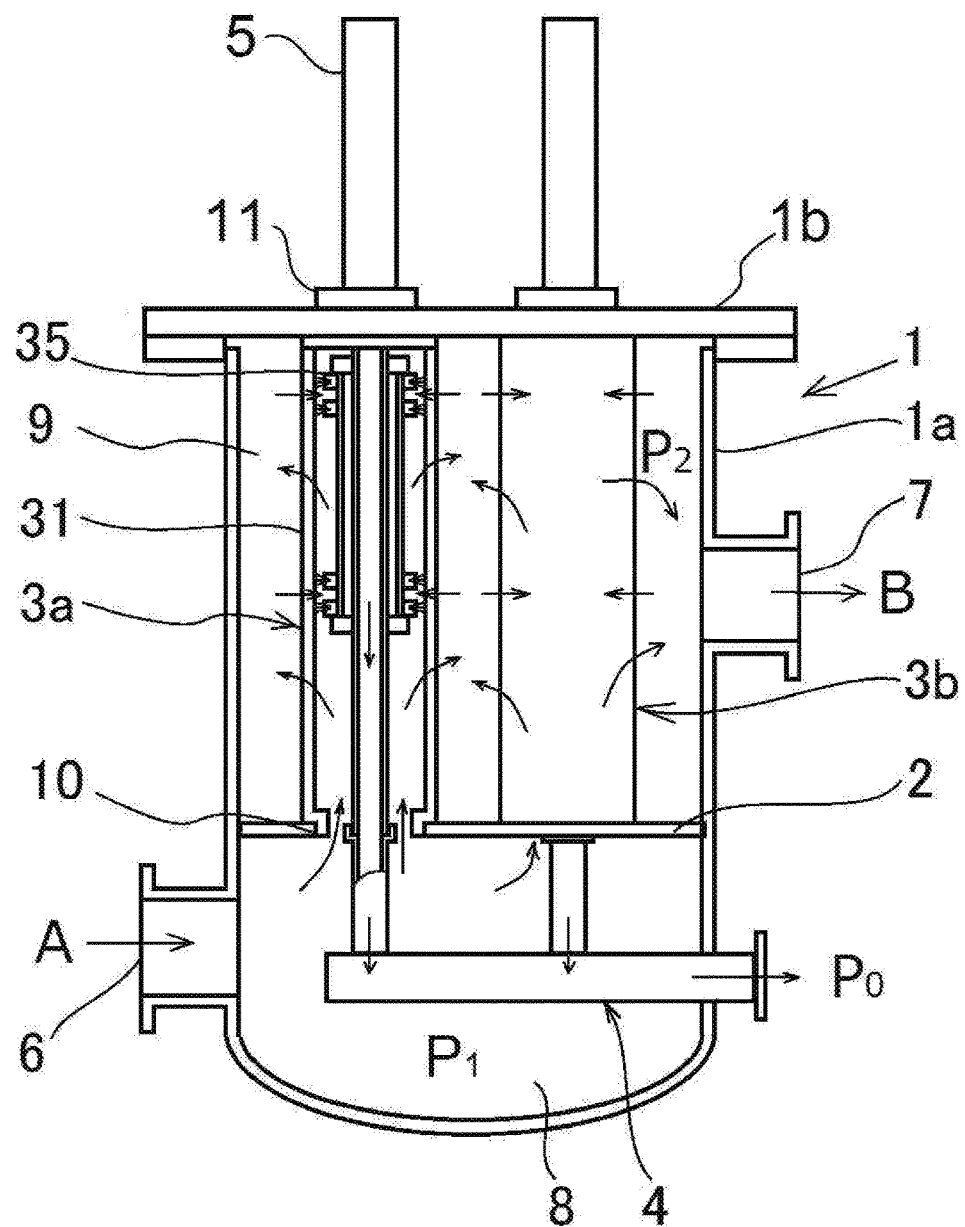
FIG. 6 is a schematic sectional view illustrating a state of the filtration device of FIG. 1 during backwashing.

Next, the operation of the first embodiment of the filtration device constructed as mentioned above will be described with reference to FIG. 1 (during filtration), and FIG. 5 and FIG. 6 (during backwashing).

During filtration, the backwash heads 35 are at a stop while being in surface contact with predetermined portions of the planar filter media 31. The on-off valve in the backwash fluid discharging system is closed, and hence backwashing of the backwash heads 35 is not carried out. Fluid to be filtered flows from the fluid inlet 6 into the raw fluid chamber 8 of the casing 1 as indicated by arrow A. This fluid has been pressurized by a pump (such as a centrifugal pump) to have a pressure (primary pressure $P_1$) higher than pressure (secondary pressure $P_2$) in the filtered-fluid chamber 9. Accordingly, the fluid in the inside of the box-shaped filter elements 3a, 3b communicating with the raw fluid chamber 8, passes through portions of the planar filter media 31, with which the backwash heads 35 are not in surface contact, and flows out to the filtered-fluid chamber 9 outside the filter elements, to thereby be filtered. At this time, foreign substances such as plankton and algae are trapped on the faces of the planar filter media 31 facing to the inside of the box-shaped filter element 3. The fluid filtered by passing through the planar filter media 31a, 31b flows out from the fluid outlet 7 to the outside as indicated by arrow B.

On the other hand, during backwashing, the on-off valve in the backwash fluid discharging system is opened to make the inside of the backwash fluid discharging system communicate with a low-pressure side such as the atmospheric pressure $P_0$ so as to have a reduced pressure. Thus, as illustrated in FIG. 5 and FIG. 6, flow of fluid into the backwash heads 35 is started, and the backwash heads 35 are reciprocated vertically by the air cylinders 5.

Since the pressure inside the inflow inlets 38 of the backwash heads 35 in surface contact with the planar filter media 31 is reduced to be lower than the secondary pressure $P_2$, fluid in the filtered-fluid chamber 9 having the secondary pressure $P_2$ passes through the surface contact portions of the planar filter media 31 and flows into the inflow inlets 38 of the backwash heads 35. At this time, foreign substances trapped on the internal faces of the box-shaped filter element 3 of the planar filter media 31 during filtration are removed by this fluid flow, and flows into the inflow inlets 38 of the backwash heads 35 together with backwash fluid. After that, the removed foreign substances are discharged through the movable pipe through holes 43, the cylindrical gap 42, the fixed pipe through holes 44, the inside of the fixed pipe 33, and the backwash fluid discharge pipe 4 (see FIG. 6) as illustrated in FIG. 5.

On the other hand, in portions of the planar filter media 31 with which the backwash heads 35 are not in surface contact at this time, fluid in the inside of the box-shaped filter element 3 passes through the planar filter media 31 and flows out to the filtered-fluid chamber 9 outside thereof like during filtration, thus continuing filtration.

The backwash heads 35 are reciprocated vertically by the air cylinders 5, and hence the entire surface or each planar filter medium 31 is backwashed. In this embodiment, since the removal brush 40 is arranged in the bank-like part 39 around the inflow inlet 38 of each of the backwash heads 35, trapped substances of the planar filter medium 31 are scraped off by the movement of the backwash head 35. At this time, since a part of fluid in the inside of the box-shaped filter element 3 also flows into the inflow inlet 38 of the backwash head 35 through gaps between bristles of the removal brush 40, the scraped, trapped substances also flow into the inflow inlet 38 of the backwash head 35. Thus, trapped substances of each planar filter medium 31 are removed sufficiently by reciprocating the backwash head 35 a predetermined number of times at a predetermined moving speed to recover the filtration performance of the planar filter medium 31.

Here, the planar filter medium 31 suitable for use in the filtration device of the present invention is so structured that the openings of mesh (i.e., of the innermost layer) to allow fluid pass through in order to filter the fluid are openings elongated in parallel with the axis of the fixed pipe.

When a planar filter medium 31 having typical square-shaped openings of mesh is used for filtration, particles having substantially the same size as the openings of the mesh may be stuck in the mesh depending on the use conditions, and the filter medium may be clogged without being able to remove the particles. There may also be a case in which fibrous foreign substances cling to the grids of mesh and cannot be removed easily.

On the other hand, when the openings of the mesh are formed into elongated openings, particles having substantially the same size as the width of the elongated openings may be stuck in the mesh, but it is unlikely that multiple small particles are stuck in the mesh to clog the mesh. Further, since the stuck particles are pinched only from the width direction of the elongated openings, they are easily removed. Also, fibrous foreign substances are less likely to twine around the elongated openings in the longitudinal direction, and they are less likely to cling thereto. Further, when the direction of elongated openings is set to be parallel with the axis of the fixed pipe (the moving direction of the backwash head), the particles and fibrous foreign substances stuck in the mesh are moved in the axial direction of the fixed pipe by the removal brush 40 provided in the backwash head 35, and likely to be removed.

Figure 7A:
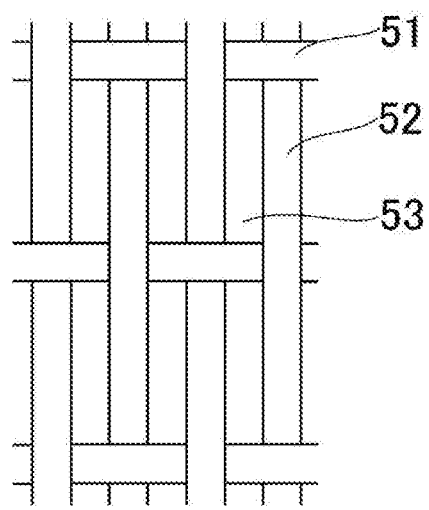
FIGS. 7A and 7B are diagrams illustrating mesh structures of the innermost layer of a planar filter medium of the filtration device of FIG. 1, where
Figure 7B:
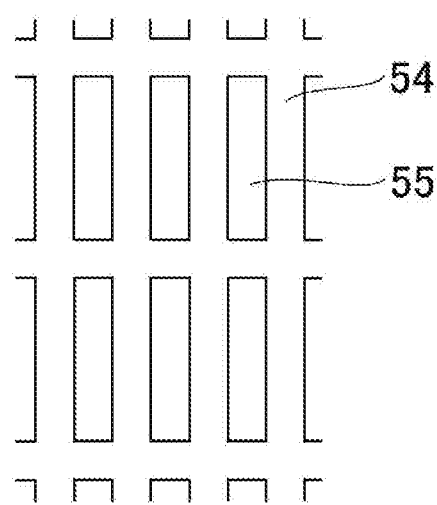

FIGS. 7A and 7B illustrate examples of the structure of the innermost layer of the planar filter medium 31 having such elongated openings. FIG. 7A illustrates the innermost layer composed of wires of a plain woven wire mesh, where the pitch of wire mesh 51, 52 of the fixed pipe in the axial direction is made longer than the pitch in the orthogonal direction thereof to realize elongated openings. In FIG. 7B, the innermost layer of the planar filter medium 31 is made of punched metal 54 with elongated openings 55 bored in parallel with the axis of the fixed pipe.

Any structure other than these can be used as the structure of the innermost layer that realizes the elongated openings. It is preferred that the dimensional ratio of the elongated openings between the long axial direction and the short axial direction be 2 or more, and it is further preferred that it be 3 or more. Further, outside of the innermost layer having such a structure, a reinforcing mesh of further coarse weave may be laminated as needed as mentioned above.

As another planar filter medium 31 suitable for use in the filtration device of the present invention, the mesh pitch pa of the innermost layer of the fixed pipe in the axial direction to allow fluid to pass through and filter the fluid is set larger than the mesh pitch pt thereof in the orthogonal direction.

Figure 8A:
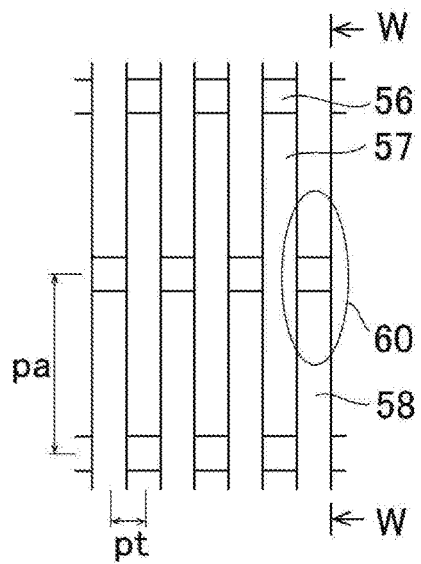
FIGS. 8A and 8B are diagrams illustrating a mesh structure of the innermost layer of the planar filter medium of the filtration device of FIG. 1, where
Figure 8B:
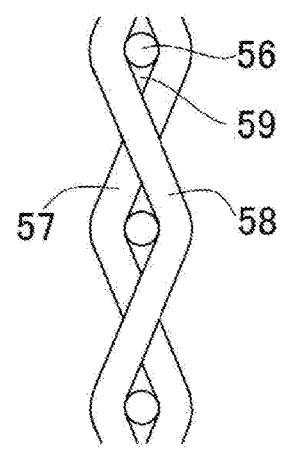

As this example, FIG. 8A illustrates the innermost layer of a planar filter medium 31 made up of a plain dutch woven mesh. This mesh is formed in such a manner that multiple warp wires 56 (the crosswise direction in the figure) extending in the circumferential direction of the planar filter medium 31 and spaced with a large pitch pa from each other in the axial direction, and multiple weft wires 57, 58 (the lengthwise direction in the figure) extending in a direction parallel with the axis of the fixed pipe and contact closely with a small pitch pt from each other in the orthogonal direction are woven in a dutch weave pattern. In this plain dutch woven mesh, since adjacent weft wires 57 and 58 are woven to wrap around each warp wire 56 from different sides, gaps 59 are formed between these weft wires 57, 58 and the warp wire 56 (see the cross section in FIG. 8B), and the fluid is filtered while passing through the gaps. At this time, since a groove portion 60 is formed between every other weft wires 57, 57 or 58, 58, particles and foreign substances such as fiber may be stuck in this groove portion 60. In the planar filter medium 31, since the direction of weft wires 57, 58 is set parallel with the axis of the fixed pipe (the axis of the planar filter medium 31), the direction of the groove portion 60 is also the axial direction of the planar filter medium 31. When this filter medium is used in the filtration device of the present invention, the particles and the foreign substances such as fiber stuck in the groove 60 are easy to move and likely to be removed by the removal brush 40 provided in the backwash head 35.

As the structure of the innermost layer in which the mesh pitch pa of the planar filter medium 31 in the axial direction of the fixed pipe is larger than the mesh pitch pt in the orthogonal direction thereof, any structure other than the above structure can be used. For example, the same effect can also be obtained by using a twilled dutch woven mesh.

Although use of any of the above planar filter media 31 illustrated in FIG. 7 and FIG. 8 in the filtration device of the present invention can more enhance the backwashing effect because the foreign substances trapped on the planar filter medium 31 are easily removed by the removal brush 40 provided in the backwash head 35, the filter medium is not limited to those illustrated in FIG. 7 and FIG. 8, and the filtration device of the present invention can achieve a sufficiently high backwashing effect even using a conventional planar filter medium.

Second Embodiment

A filtration device of this embodiment uses a tube-shaped filter element open at only one side. This filtration device is one in which the box-shaped filter element 3 in the filtration device of the first embodiment illustrated in FIG. 1 is replaced with a tube-shaped filter element. Since this filtration device is the same as the filtration device of the first embodiment except for the shapes of the filter element and the through hole 10 of the partition wall 2 on which the filter element is mounted, only the tube-shaped filter element will be described while omitting the description of the entire filtration device.

Figure 9:
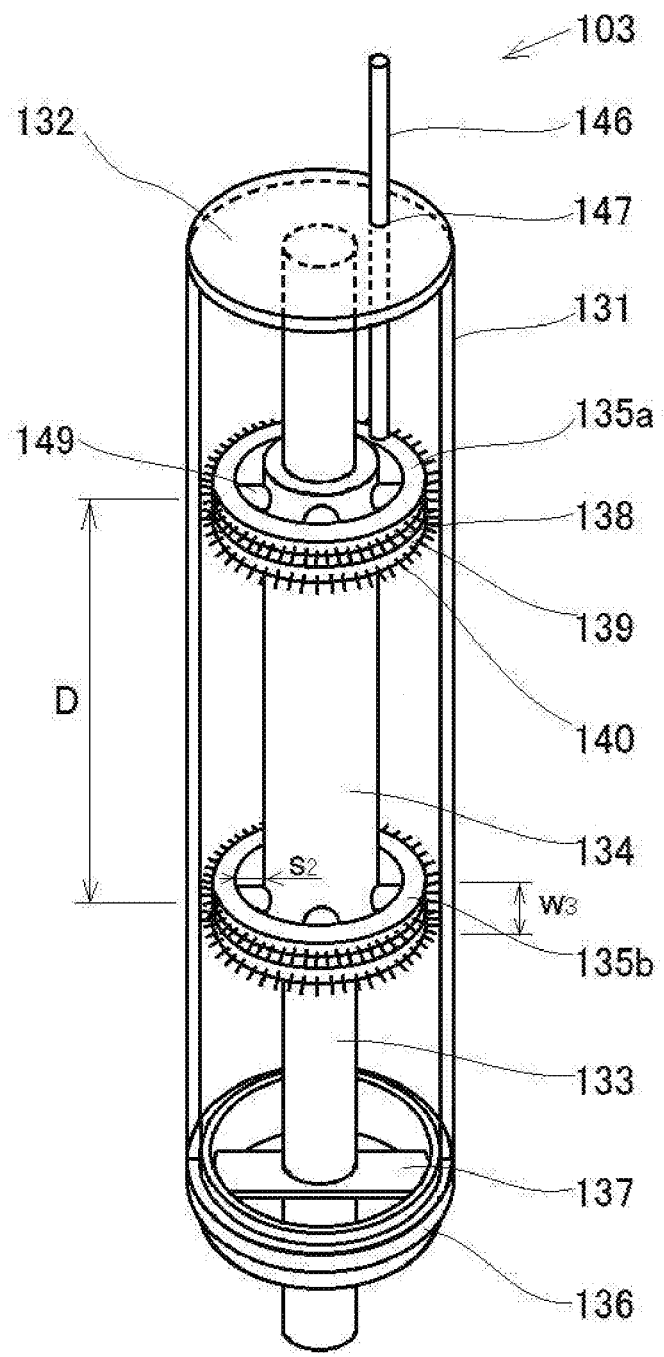
FIG. 9 is a schematic perspective view illustrating a tube-shaped filter element of a second embodiment of a filtration device according to the present invention.

FIG. 9 is a schematic perspective view illustrating a tube-shaped filter element 103 of the embodiment. This tube-shaped filter element 103 has a tubular filter medium 131 to allow target fluid to pass through from inside to outside so as to filter the fluid by trapping solid matter, gel dust, and the like contained in the fluid, and to backwash the tubular filter medium 131 using a backwashing mechanism (133, 134, 135a, 135b) provided inside thereof. Note that the tube-shaped filter element 103 and the tubular filter medium 131 formed into a cylindrical shape are illustrated in FIG. 9. The tube-shaped filter element 103 is provided vertically with the open end facing down. Accordingly, among the trapped substances, heavy trapped substances such as pebbles that are difficult to remove by the backwashing mechanism become easy to fall to the bottom of the casing 1, and this can reduce the failure of the backwashing mechanism. One or more tube-shaped filter elements 103 are arranged inside the casing 1.

As illustrated in FIG. 9, the tube-shaped filter element 103 forms a cylindrical body open at the lower side, which includes the tubular filter medium 131 that forms a cylindrical surface of the tube-shaped filter element 103 with both upper and lower ends open, and a closure plate 132 that closes the upper end thereof. The filter element 103 has, inside the cylindrical body, a backwashing mechanism composed of a fixed pipe 133 and movable pipe 134 assembly arranged in the axial direction, and two annular backwash heads 135a, 135b attached around this movable pipe 134 at an interval in the axial direction.

Like in the first embodiment, the tubular filter medium 131 may be any filter medium so long as it is formed into multiple laminated layers so that the innermost layer will be the finest mesh, but it has to be formed in a tubular shape rather than the planar shape.

The closure plate 132 is formed in a disk-like shape to close the upper face of the tubular filter medium 131 and fix and hold the upper end of the fixed pipe 133.

Although the lower end of the tubular filter medium 131 is open, an annular end member 136 is provided around the opening so that it can be fitted in the through hole 10 of the partition wall 2 and the lower end of the fixed pipe 133 will be supported by a supporting member 137 provided across the opening of the end member 136.

The fixed pipe 133 and the movable pipe 134 fitted around the outside of the fixed pipe 133 movably guide the backwash heads 135 and form a discharge passage for backwash fluid. As illustrated in FIG. 9, the fixed pipe 133 is provided on the center axis of the cylindrical shape of the tubular filter medium 131, the upper end of the fixed pipe 133 is fixed to the closure plate 132, the lower end portion thereof is supported by the supporting member 137, and the lower end thereof is connected to the backwash fluid discharge pipe 4. The movable pipe 134 is fitted around the outside of the fixed pipe 133 to be movable in the axial direction thereof, and each of the backwash heads 135 is attached to the outer circumferential side via four water pipes 149. According to this structure, since the contact pressure or a gap between the backwash head 135 and the tubular filter medium 131 is determined by the distance between the tubular filter medium 131 and the fixed pipe 133 fixed to the tube-shaped filter element 103, assembly adjustment is made unnecessary or easy.

Figure 10:
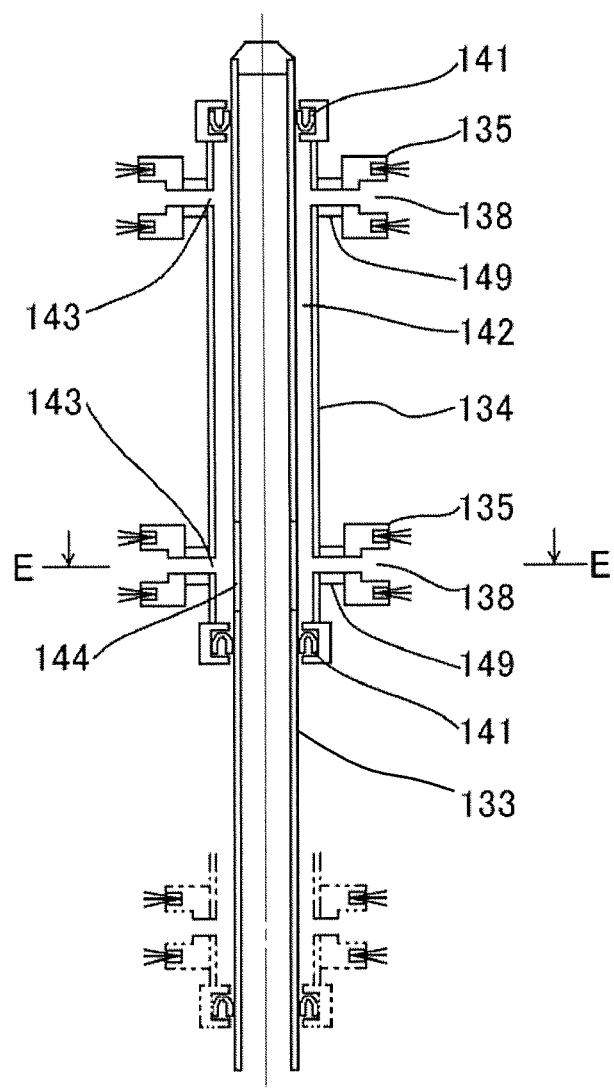
FIG. 10 is a schematic longitudinal sectional view illustrating backwash heads, a movable pipe, and a fixed pipe of the tube-shaped filter element of FIG. 9.
Figure 11:
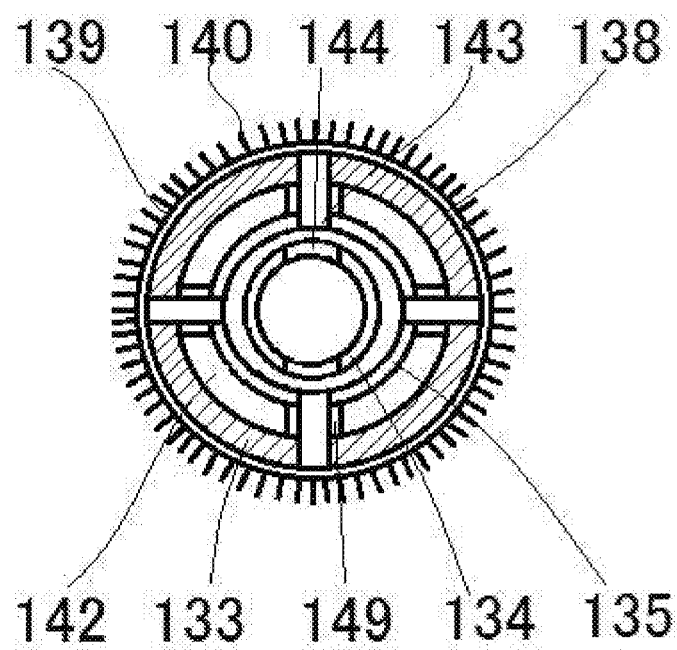
FIG. 11 is a sectional view taken along line E-E in FIG. 10.

The structure of the fixed pipe 133 and movable pipe 134 assembly is illustrated in a schematic sectional view of FIG. 10 and FIG. 11 that is a sectional view of line E-E in FIG. 10. Since this structure is to movably guide the backwash heads 135 and form a discharge passage for backwash fluid, and is basically the same as the structure of the first embodiment illustrated in FIG. 3, the detailed description thereof will be omitted. A point different from the device of the first embodiment is that the movable pipe 134 and the backwash heads 135 are connected via the water pipes 149, and inflow inlets 138 of the backwash heads 135 communicate with the inside of the movable pipe 134 through the inside of the water pipes 149 so that backwash water flowing into the backwash heads 135 will flow out to the inside of the movable pipe 134 through the inside of the water pipes 149. The lower end side of the fixed pipe 133 is open to be connectable to the backwash fluid discharge pipe 4.

The backwash heads 135 are so arranged that the inflow inlets 138 will come into surface contact with the inside of the tubular filter medium 131 to allow fluid in the filtered-fluid chamber 9 to flow through the tubular filter medium 131 into the inflow inlets 138 so as to backwash the tubular filter medium 131. In this embodiment, as illustrated in FIG. 9, the upper and lower backwash heads 135a, 135b are each attached to the movable pipe 134 via the four water pipes 149. Since the upper and lower backwash heads 135a, 135b are arranged at an interval D in the axial direction of the movable pipe 134, two portions of the tubular filter medium 131 in the axial direction thereof can be backwashed at the same time, and hence the entire area of the tubular filter medium 131 in the axial direction thereof can be backwashed in a small movable stroke.

Each backwash head 135 is formed in an annular shape, has a groove-like inflow inlet 138 continuous in the circumferential direction of the outer circumference, and the dimensions thereof are set to be able to backwash the entire circumference at the same time. Thus, the whole surface of the tubular filter medium 131 can be backwashed only by the movement in the axial direction of the fixed pipe 133 and the movable pipe 134. Note that, since a width w3 of the backwash head 135 is small, filtration can be continued even during backwashing in portions at which the backwash head 135 is not in surface contact with the filter surface, and hence a high usage efficiency of the filtration device can be secured. Further, there is a space s2 between the movable pipe 134 and the backwash head 135 in the radial direction to allow raw fluid to pass therethrough.

Further, in the embodiment, a removal brush 140 is arranged in each of bank-like parts 139 provided on both sides of the inflow inlet 138 of the backwash head 135 in the width direction like in the first embodiment to scrape trapped substances on the tubular filter medium 131 by the movement of the backwash head 135. This can enhance the backwashing effect.

A drive rod 146 is provided to project from the upper face of the upper backwash head 135a so as to project from the upper face of the tube-shaped filter element 103 through the through hole 147 bored in the closure plate 132. Note that a seal (not illustrated) is provided between the through hole 147 and the drive rod 146 not to let fluid leak out.

The operation of the second embodiment of the filtration device structured as mentioned above is the same as that of the filtration device of the first embodiment. It is only necessary to interpret the operation by replacing the box-shaped filter element 3, the planar filter medium 31, the fixed pipe 33, the movable pipe 34, and the backwash heads 35 in the description of the operation of the first embodiment with reference to FIG. 1 to FIG. 6 with the tube-shaped filter element 103, the tubular filter medium 131, the fixed pipe 133, the movable pipe 134, and the backwash heads 135 of this embodiment, respectively.

Third Embodiment

Figure 12:
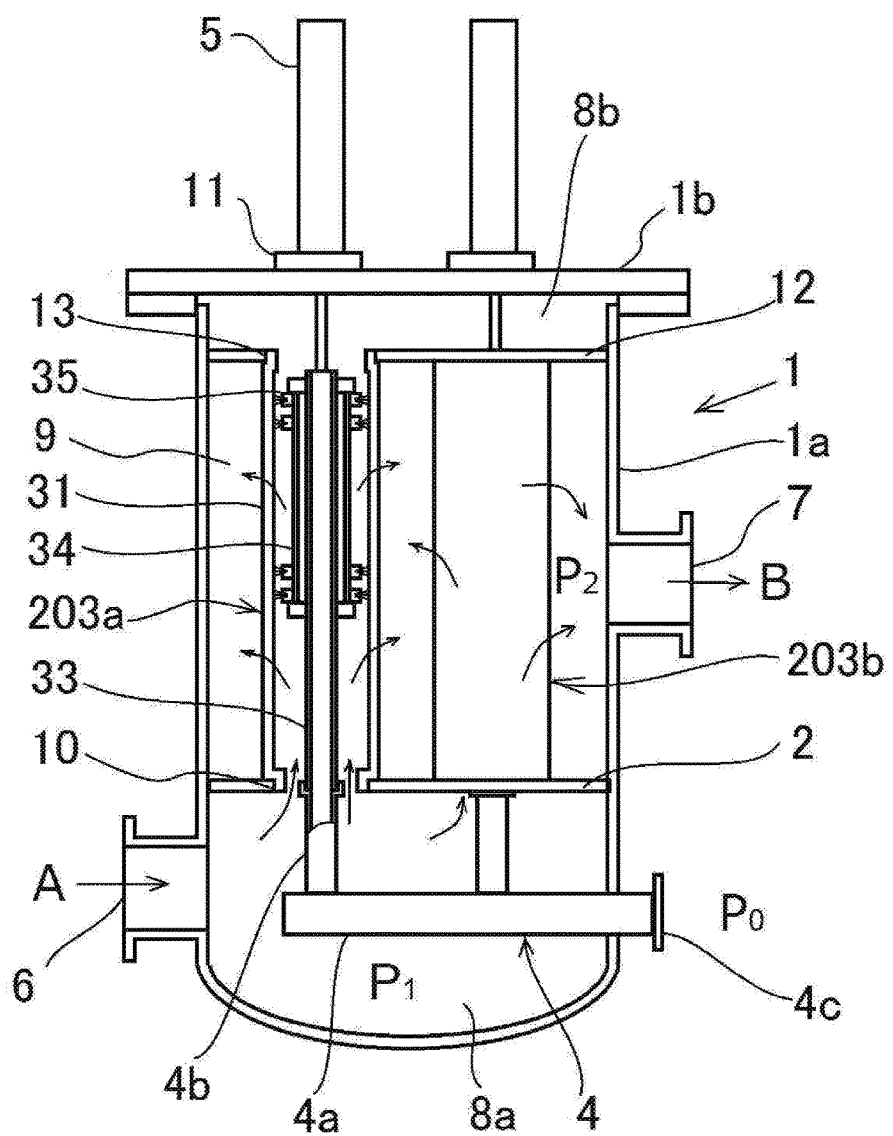
FIG. 12 is a schematic sectional view illustrating a state of a third embodiment of a filtration device according to the present invention during filtration.

FIG. 12 is a schematic sectional view illustrating a state of a third embodiment of a filtration device according to the present invention during filtration.

The filtration device of this embodiment takes a form of using a box-shaped filter element in which upper and lower faces opposite to each other are open in such a manner that these two openings communicate with raw fluid chambers provided in the upper and lower parts inside a casing. This structure has the advantages (1) and (2) below.

(1) Since raw fluid is supplied also from the raw fluid chamber provided in the upper part of the casing through the upper opening, the speed of filtration is less likely to be decreased.

(2) The backwashing mechanism except the fixed pipe can be pulled out through the upper opening at the time of maintenance, and hence the inner surface of the box-shaped filter element can be washed from the opening by using a jet shower or the like without pulling out the entire box-shaped filter element.

The filtration device of the third embodiment illustrated in FIG. 12 is different from the device of the first embodiment illustrated in FIG. 1 in that a box-shaped filter element 203 whose two upper and lower faces opposite to each other are open is so used that a second partition wall 12 is provided on the upper end side of the box-shaped filter element 203 inside the casing 1 to be parallel with the partition wall 2 to fit and hold the upper end of the box-shaped filter element 203 in a through hole 13, and to form a second raw fluid chamber 8b above the partition wall 12 in a manner to be isolated from the filtered-fluid chamber 9. This second raw fluid chamber 8b communicates with a raw fluid chamber 8 (called a first raw fluid chamber 8a in the embodiment) below the partition wall 2 through the inside of each box-shaped filter element 3.

Figure 13:
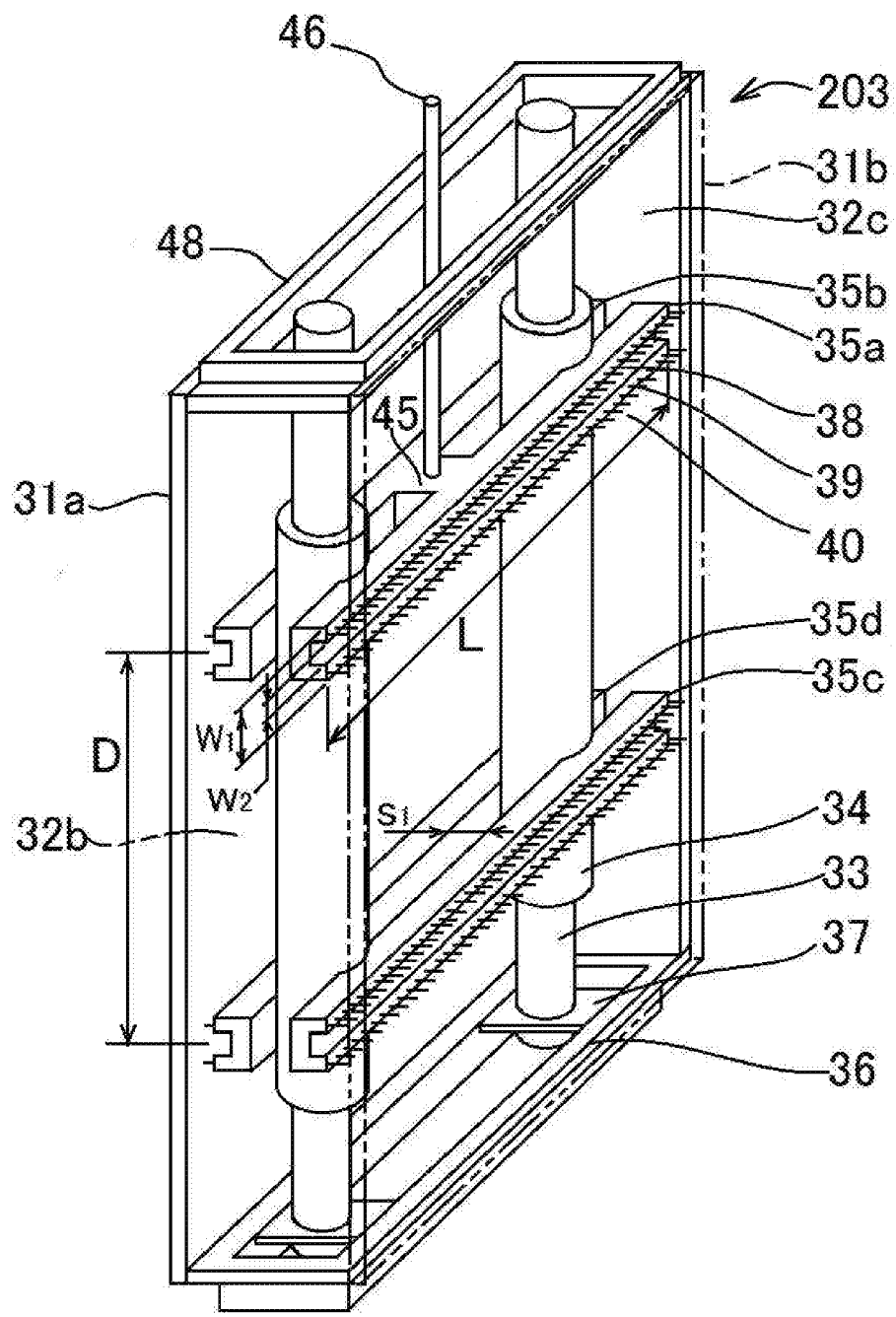
FIG. 13 is a schematic perspective view illustrating a box-shaped filter element of the filtration device of FIG. 12.

FIG. 13 is a schematic perspective view illustrating the box-shaped filter element 203 of the filtration device of FIG. 12. This box-shaped filter element 203 has a box-like shape in which two upper and lower faces opposite to each other are open. In comparison with the box-shaped filter element 3 of FIG. 2, it is different in that a frame-like upper end member 48 having an opening is provided instead of closing the upper face using the upper end plate 32a. As a result, the upper ends of the fixed pipes 33 are unfixed free ends and only the lower ends of the fixed pipes 33 are fixed by support members 37. Since this upper opening has such dimensions that the movable pipes 34, the backwash heads 35, and the drive rod 46 can pass therethrough in an integrated fashion, the movable pipes 34 integrated with the backwash heads 35 and the drive rod 46 can be pulled out of the fixed pipes 33 or inserted into the fixed pipes 33 through this opening.

Since the structures of the filtration device and the box-shaped filter element 203 of the embodiment are the same as in the first embodiment except for these points mentioned above, constituent elements common to those in the first embodiment illustrated in FIGS. 1 to 8 are given the same reference numerals and description thereof is omitted.

The operation of the filtration device of the third embodiment structured as mentioned above is basically the same as the operation of the filtration device of the first embodiment. However, the speed of filtration is less likely to be decreased because raw fluid is also supplied from the second raw fluid chamber 8b through the upper opening. In other words, as in the description of the first embodiment, there is the space s1 between each pair of backwash heads 35 arranged back to back in the box-shaped filter element 203 to allow raw fluid to pass therethrough. However, the space s1 of one box-shaped filter element 203 may be clogged with foreign substances in raw fluid depending on the use conditions to make it difficult for raw fluid from the first raw fluid chamber 8a to flow through. Even in such a case, since raw fluid supplied to the second raw fluid chamber through the other box-shaped filter element 203 is supplied to the one box-shaped filter element 203 from the upper opening, the filtration speed can be maintained.

At the time of maintenance, it is only necessary to remove the upper lid 1b from the casing so that the movable pipes 34, the backwash heads 35, and the drive rod 46 can be integrally pulled out of or inserted into the box-shaped filter element 203 without removing the second partition wall 12 and the box-shaped filter element 203. These movable pipes 34, backwash heads 35, and drive rod 46 that have pulled out and the remaining box body of the box-shaped filter element 203 can be washed by a jet shower or the like. This makes maintenance easier than in the case of the first embodiment. Of course, it is possible to carry out disassembly cleaning or the like by removing the box-shaped filter element 203 from the partition wall 2 in the same manner as in the first embodiment after removing the casing upper lid 1b and the second partition wall 12.

Fourth Embodiment

A filtration device of this embodiment uses a tube-shaped filter element in which upper and lower faces opposite to each other are open. This filtration device is one in which the box-shaped filter element 203 in the filtration device of the third embodiment illustrated in FIG. 12 is replaced with a tube-shaped filter element. Since this filtration device is the same as the filtration device of the third embodiment except for the shapes of the filter element and the through hole 10 of the partition wall 2 on which the filter element is mounted, only the filter element will be described while omitting the description of the entire filtration device.

Figure 14:
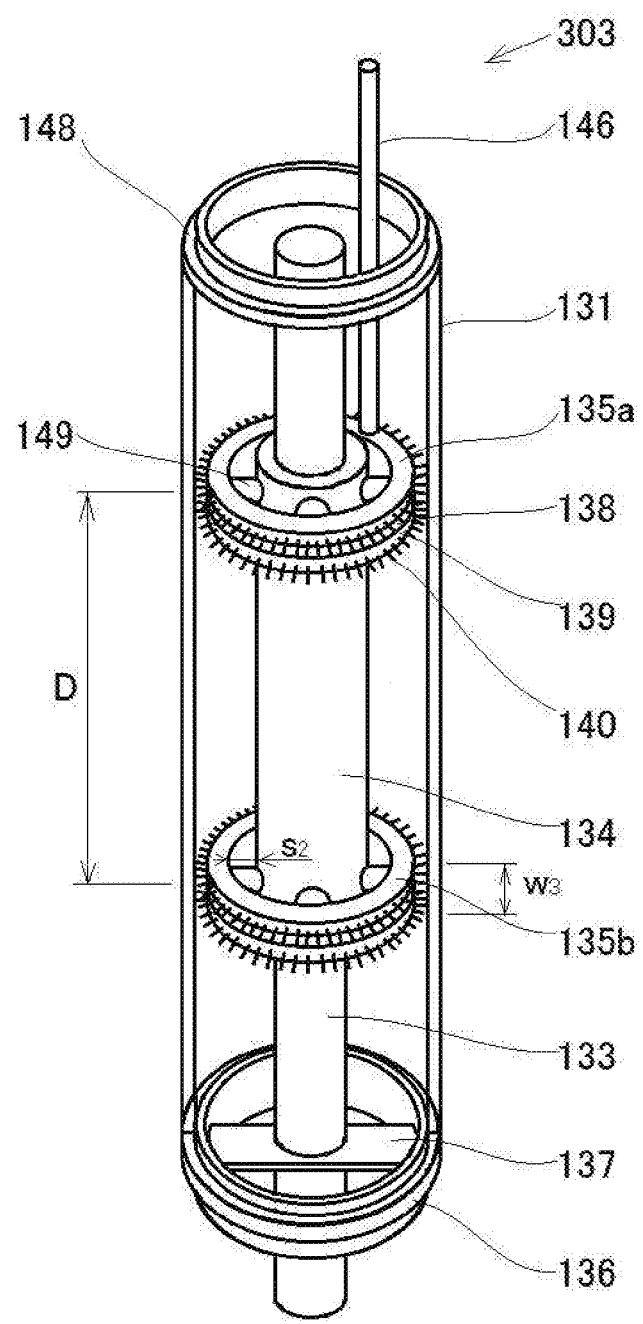
FIG. 14 is a schematic perspective view illustrating a tube-shaped filter element of a fourth embodiment of the filtration device according to the present invention.

FIG. 14 is a schematic perspective view illustrating a tube-shaped filter element 303 of the filtration device of this embodiment. This tube-shaped filter element 303 has a tubular shape in which upper and lower faces opposite to each other are open. In FIG. 14, the tube-shaped filter element 303 formed into a cylindrical shape is illustrated. In comparison with the tube-shaped filter element 103 of the second embodiment illustrated in FIG. 9, it is different in that an annular upper end member 148 having an opening is provided instead of closing the upper face using the closure plate 132. As a result, the upper end of the fixed pipe 133 is an unfixed, free end, and only the lower end thereof is fixed by a support member 137. Since this upper opening has such dimensions that the movable pipe 134, the backwash heads 135, and the drive rod 146 can pass therethrough in an integrated fashion, the movable pipe 134 integrated with the backwash heads 135 and the drive rod 146 can be pulled out of the fixed pipe 133 or inserted into the fixed pipe 133 through this opening.

Since the structure of the tube-shaped filter element 303 of the embodiment is the same as that of the tube-shaped filter element 103 of the second embodiment except for these points, constituent elements common to those in the second embodiment illustrated in FIG. 9 are given the same reference numerals in FIG. 14 and description thereof is omitted.

The operation of the filtration device of the fourth embodiment structured as mentioned above is basically the same as the operation of the filtration device of the third embodiment using the box-shaped filter element 203 with two faces open. Like in the third embodiment, even when the space s2 of one tube-shaped filter element 303 is clogged with foreign substances in raw fluid to make it difficult for raw fluid from the first raw fluid chamber 8a to flow through, raw fluid supplied to the second raw fluid chamber through the other tube-shaped filter element 303 is supplied to the one tube-shaped filter element 303 from the upper opening, and hence the filtration speed can be maintained.

At the time of maintenance, it is only necessary to remove the upper lid 1b from the casing so that the movable pipe 134, the backwash heads 135, and the drive rod 146 can be integrally pulled out of or inserted into the tube-shaped filter element 303 without removing the second partition wall 12 and the tube-shaped filter element 303. These movable pipes 134, backwash heads 135, and drive rod 146 that have pulled out and the remaining part of the tube-shaped filter element 303 can be washed by a jet shower or the like.

In the first to fourth embodiments, the filtration devices having multiple filter elements 3, 103, 203, and 303 are illustrated, but the number of filter elements can be one in the filtration device of the present invention.

Further, in the second and fourth embodiments, the form of using a cylinder-shaped filter element having a cylindrical filter medium is illustrated as the tube-shaped filter element 103, 303, but the form is not limited to the cylindrical shape. For example, the tube-shaped filter element may be one having a tube-shaped filter medium polygonal in cross section. Even in this case, not only can a raw fluid enter from the open face pass through from the inside to the outside to be filtered, but also the backwashing mechanism composed of the fixed pipe, the movable pipe, and the backwash heads can be arranged inside to backwash the filter.

[Variation]

Figure 15:
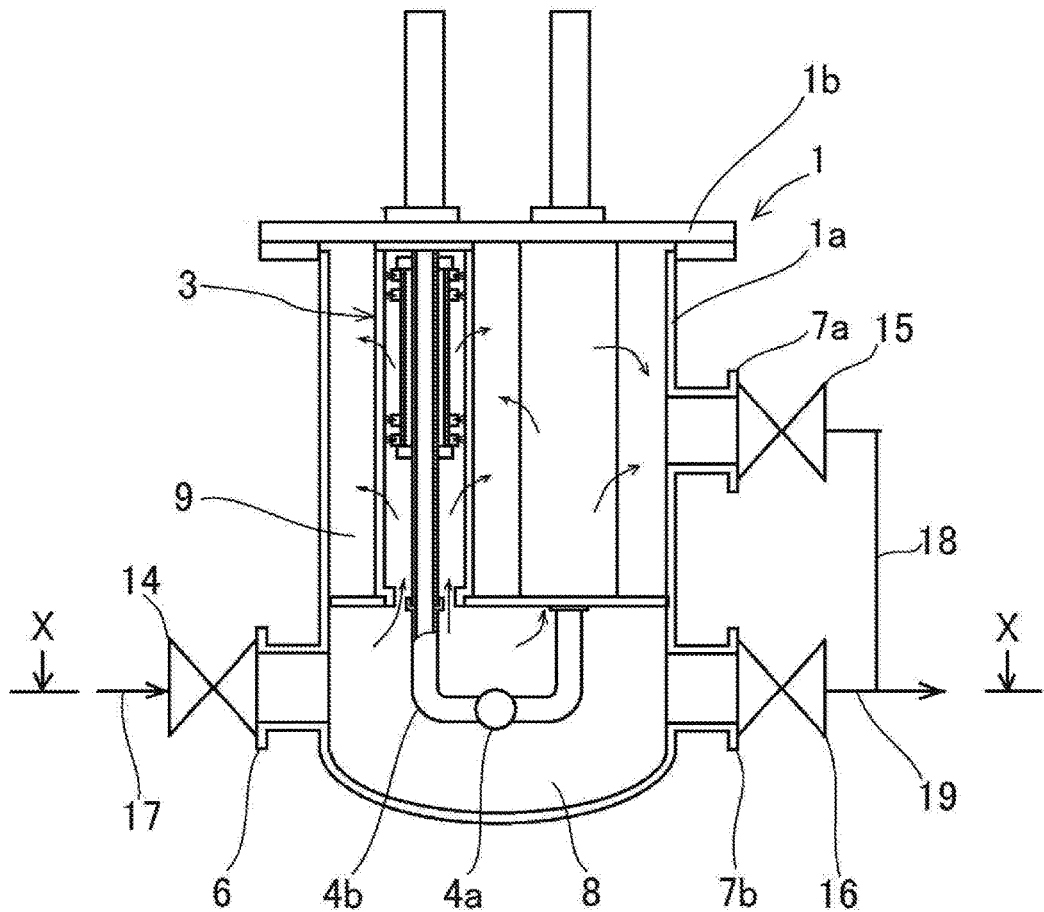
FIG. 15 is a schematic sectional view illustrating a variation of the filtration device of the present invention.

FIG. 15 is a schematic sectional view of a variation of the filtration device of the present invention. In addition to a first fluid outlet communicating with a filtered-fluid chamber, a casing of this filtration device further has a second fluid outlet communicating with a raw fluid chamber to discharge fluid before being filtered.

The parts of the filtration device illustrated in FIG. 15 other than the casing are the same as those in the filtration device of the first embodiment illustrated in FIG. 1. However, the parts of the filtration device other than the casing in this variation are not limited thereto, and they may be the same as in any of the filtration devices in the second to fourth embodiments.

The filtration device of FIG. 15 is different from the filtration device of FIG. 1 only in that a second fluid outlet 7b is provided to communicate with the raw fluid chamber 8 of the casing main body 1a. Further, the structure of the box-shaped filter element 3 is the same as that of the first embodiment. FIG. 15 also illustrates valves 14, 15, and 16 provided at a fluid inlet 6, a fluid outlet 7 (also called as a first fluid outlet 7a in this embodiment) communicating with the filtered-fluid chamber, and the second fluid outlet 7b, respectively.

In FIG. 15, the second fluid outlet 7b is arranged in the same direction as the first fluid outlet 7a for the convenience of a pipe 18 for connecting them, and hence provided in a position opposite to the fluid inlet 6. Therefore, the direction of a linear section 4a of the backwash fluid discharge pipe 4 is set in a direction orthogonal to the direction to connect the fluid inlet 6 and the second fluid outlet 7b not to interfere therewith. However, the structure is not limited thereto, and the first fluid outlet 7a and the second fluid outlet 7b may be provided in a direction orthogonal to the fluid inlet 6 as long as it does not interfere with the backwash fluid discharge pipe 4 or the like.

Figure 16:
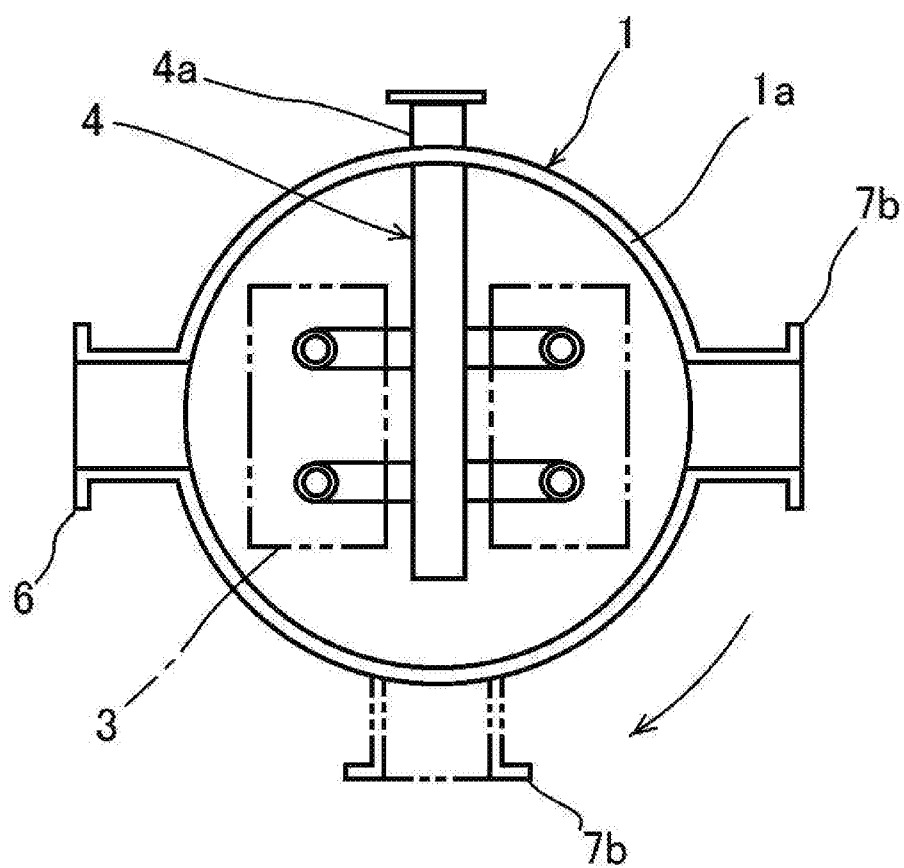
FIG. 16 is a sectional view of the filtration device taken along line X-X in FIG. 15.

FIG. 16 shows a cross-section of the filtration device of FIG. 15 taken along line X-X indicated by the solid line (where the valves are not shown). However, the first and second fluid outlets 7a, 7b may be placed in a direction orthogonal to the fluid inlet 6 as indicated by the dashed-two dotted line, and this position can be selected according to the convenience of piping to be connected to the filtration device. Note that, when there is no need to let raw fluid pass through without filtration, the second fluid outlet 7b can also be closed by a lid or the like and be used as a hole for maintenance work.

The operation of the filtration device of this variation structured as mentioned above is basically the same as the operation of the filtration device of the first embodiment illustrated in FIG. 1 except that switching is possible between filtration of raw fluid and passing of raw fluid inside the filtration device.

First, during filtration, the valve 14 provided at the fluid inlet 6 and the valve 15 provided at the first fluid outlet 7a are opened and the valve 16 provided at the second fluid outlet 7b is closed, so that fluid flows from an upstream line 17 via the raw fluid chamber 8, passes through the box-shaped filter element 3 to be filtered, and flows out via the filtered-fluid chamber 9 to a downstream line 18.

On the other hand, during passing, the valve 14 provided at the fluid inlet 6 and the valve 16 provided at the second fluid outlet 7b are opened and the valve 15 provided at the first fluid outlet 7a is closed, so that fluid flows out from the upstream line 17 via the raw fluid chamber 8 to a downstream line 19 without being filtered and joins the downstream line 18.

Note that backwashing using backwash heads of this filtration device is possible both during filtration and during passing.

Thus, these valves 15 and 16 can be switched to switch between the filtration and passing of fluid. Therefore, since the filtration device serves as part of a main line to eliminate the need to provide a bypass line having a valve between the fluid inlet 6 and the first fluid outlet 7a, the piping route can be simplified to reduce the size of the entire system.

REFERENCE SYMBOL LIST

1 . . . casing
1a . . . casing main body
1b . . . casing lid
2 . . . partition wall
3, 3a, 3b, 203, 203a, 203b . . . box-shaped filter element
4 . . . backwash fluid discharge pipe
5 . . . driving source (air cylinder)
6 . . . fluid inlet
7 . . . fluid outlet
7a . . . first fluid outlet
7b . . . second fluid outlet
8 . . . raw fluid chamber
9 . . . filtered-fluid chamber
10 . . . through hole
11 . . . adapter
14 . . . first valve
15 . . . second valve
16 . . . third valve
31, 31a, 31b . . . planar filter medium
33.133 . . . fixed pipe
34, 134 . . . movable pipe
35, 35a, 35b, 35c, 35d, 135, 135a, 135b . . . backwash head
38, 138 . . . inflow inlet
39, 139 . . . bank-like part
40, 140 . . . removal brush
46, 146 . . . drive rod
53 . . . openings of mesh
55 . . . openings of mesh
103, 303 . . . tube-shaped filter element
131 . . . tubular filter medium
L . . . length of inflow inlet
w2 . . . width of inflow inlet

The invention claimed is:

1. A filtration device comprising:
a casing having a fluid inlet and a fluid outlet, and including, inside thereof, first and second raw fluid chambers communicating with the fluid inlet for storing fluid before being filtered, and a filtered-fluid chamber communicating with the fluid outlet for storing filtered fluid;
a plurality of filter elements removably installed in parallel inside the casing, each of the plurality of filter elements having a filter medium and formed into a box or tube shape, and two opposite faces which are open to the first and second raw fluid chambers, respectively, to receive fluid from the first and second raw fluid chambers through the two opposite faces and allow the fluid to pass through from inside toward the filtered-fluid chamber outside thereof so as to filter the fluid, and having a backwashing mechanism inside thereof; and
a backwash fluid discharge pipe which discharges backwash fluid from the backwashing mechanism to the outside of the casing,
wherein the second raw fluid chamber communicates with the fluid inlet via the inside of the each of the plurality of filter elements and the first raw fluid chamber,
wherein the backwashing mechanism includes:
a fixed pipe fixed to the inside of the each of the plurality of filter elements and connected to the backwash fluid discharge pipe;
a movable pipe fitted to the outside of the fixed pipe and provided to be movable in an axial direction thereof; and
at least one backwash head attached to the movable pipe and having an inflow inlet arranged to come into surface contact with the filter medium to allow fluid outside of the each of the plurality of filter elements to pass through the filter medium as backwash fluid and flow into the inflow inlet in order to backwash the filter medium, and
wherein the fixed pipe and the movable pipe movably guide the backwash head and form a discharge passage for backwash fluid.

2. The filtration device according to claim 1, wherein the each of the plurality of filter elements is formed into a box shape, the filter medium is formed into a planar shape and provided on each of the two opposite faces other than the two opposite faces that are open in the each of the plurality of filter elements, and at least one pair of the backwash heads are arranged back to back with the movable pipe interposed, in such a manner that the inflow inlets thereof come into surface contact with respective planar filter media from the inside of the each of the plurality of filter elements.

3. The filtration device according to claim 2, wherein the inflow inlet of each of the backwash heads has a dimension capable of backwashing the whole planar filter medium in a direction orthogonal to an axis of the fixed pipe at one time.

4. The filtration device according to claim 2, wherein the dimension of the inflow inlet of the backwash head is 3 mm or more in width and 20 mm or more in length.

5. The filtration device according to claim 1, wherein
the each of the plurality of filter elements is formed into a tube shape,
the filter medium is formed into a tubular shape to form a tubular surface of the each of the plurality of filter elements, and
the backwash head is arranged to surround the movable pipe so that the inflow inlet will come into surface contact with an inside of the tubular filter medium.

6. The filtration device according to claim 1, wherein the each of the plurality of filter elements is placed so that the open one face will come to a lower side.

7. The filtration device according to claim 1, wherein a removal brush is arranged in a bank-like part formed around the inflow inlet of the backwash head to scrape trapped substances from the filter medium by movement of the backwash head.

8. The filtration device according to claim 1, further comprising an air cylinder or a hydraulic cylinder as a driving source for moving the backwash head.

9. The filtration device according to claim 1, further comprising an electric motor and a feed screw mechanism driven by the electric motor as a driving source for moving the backwash head.

10. The filtration device according to claim 1, wherein the movable pipe and the backwash heads attached thereto integrally pass through either one of two open faces opposite to each other in the each of the plurality of filter elements to be able to be pulled out of the each of the plurality of filter elements.

11. The filtration device according to claim 1, wherein openings of mesh of the filter medium are openings elongated in parallel with the axis of the fixed pipe.

12. The filtration device according to claim 1, wherein a mesh pitch of the filter medium in an axial direction of the fixed pipe is larger than a mesh pitch in a direction orthogonal to the axial direction.

* * * * *